July 18, 1950 R. SNEPVANGERS 2,515,273

SLIDABLY SUPPORTED PICK-UP HEAD

Filed Oct. 31, 1944 2 Sheets-Sheet 1

Inventor
RENÉ SNEPVANGERS
By C. D. Tuska
Attorney

July 18, 1950 R. SNEPVANGERS 2,515,273

SLIDABLY SUPPORTED PICK-UP HEAD

Filed Oct. 31, 1944 2 Sheets-Sheet 2

Inventor

RENÉ SNEPVANGERS

By C. D. Tuska

Attorney

Patented July 18, 1950 2,515,273

UNITED STATES PATENT OFFICE 2,515,273

SLIDABLY SUPPORTED PICKUP HEAD

René Snepvangers, Haddon Heights, N. J., assignor to Radio Corporation of America, a corporation of Delaware Application October 31, 1944, Serial No. 561,244

16 Claims. (Cl. 274—13)

Figure 1:
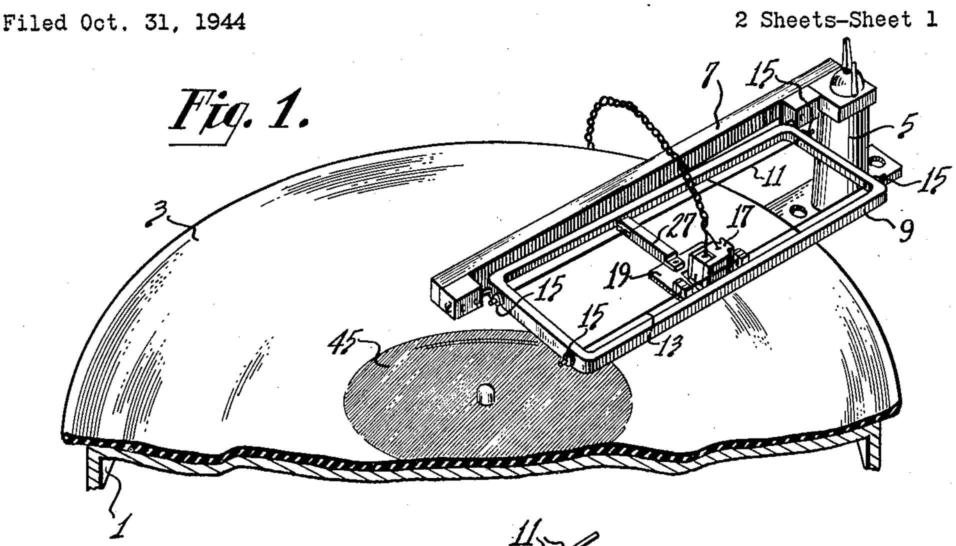

This invention relates to phonographic apparatus and more particularly to a mounting for the signal translating or pick-up device thereof.

In conventional phonographs, the pick-up device is generally mounted near one end of a pick-up arm which is arranged for swinging movement over the record. Conventional pick-up arms are so constructed and arranged that they usually exhibit low frequency resonance. If, as in most cases, the pick-up unit is rigidly mounted on the arm, then the pick-up arm resonance introduces distortion in the reproduced signal. This is particularly true where the operating parts of the pick-up have a low mechanical impedance and the needle pressure is very low on the record, as in the case of the capacity pick-up disclosed and claimed in my copending application Serial No. 538,834, filed June 5, 1944, now Patent No. 2,397,888, granted on April 2, 1946.

The primary object of my present invention is to provide an improved pick-up mounting which will provide a signal translating system free from the above mentioned disadvantage.

More particularly, it is an object of my present invention to provide an improved pick-up mounting or supporting structure in which resonance within the operating range of the pick-up will be practically eliminated.

Another object of my present invention is to provide an improved pick-up mounting structure for phonographs which has a minimum mass.

Still another object of my present invention is to provide an improved phonograph pick-up supporting structure which will impose a minimum load on the records and on which the record therefore will be required to do a minimum amount of work, thereby increasing the record life.

A further object of my present invention is to provide an improved phonograph pick-up supporting structure which will facilitate elimination of extraneous sounds, such as record noise, and the like.

Still a further object of my present invention is to provide an improved pick-up supporting structure as aforesaid which will enable the stylus or needle of the pick-up to move radially across the record in a straight line, thereby avoiding changes in tracking angle of the needle with respect to the record groove and assuring a constant tangential relation between the needle and the groove.

It is also an object of my present invention to provide an improved phonograph pick-up supporting structure as above set forth which is very light in weight, simple in construction, inexpensive in cost and highly efficient in use.

In accordance with my present invention, I provide a frame member which is pivotally mounted on one side of the turntable or other suitable record support and which is movable to a position overlying the record thereon. The frame carries two pairs of wire, guiding members on which a pick-up device of any suitable type or construction is slidably carried through a suitable carrier or mounting. This mounting includes a number of friction pads which are slotted to receive the wire, guiding elements, the latter being in frictional engagement with the pads within the slots thereof. One pair of wires is received in vertical slots in its associated friction pads to permit slight vertical movement of the pick-up unit with respect to the record whereby the pick-up can readily accommodate itself to the record groove regardless of whether the record is warped or not. The other pair of guide wire elements is received in the horizontal slot in its associated pads so that the pick-up mounting may move slightly in a horizontal direction, or in a plane parallel to that of the record. The various wire elements are maintained under different degrees of tension, the wires of each pair being in contact with each other throughout their entire lengths. This arrangement readily damps or inhibits vibration of the mounting of the pick-up supporting structure and thereby avoids troublesome resonance.

The novel features that I consider characteristic of my invention are set forth with particularity in the appended claims. The invention itself, however, both as to its organization and method of operation, as well as additional objects and advantages thereof, will best be understood from the following description of two embodiments thereof, when read in connection with the accompanying drawings, in which Figure 1 is a perspective view of one form of pick-up supporting structure according to my present invention, Figure 2 is an enlarged, fragmentary, detailed view showing the manner in which the pick-up unit is mounted on the guide wires, Figure 3 is a view similar to Fig. 1, but showing a modified form of my invention, and Figure 4 is a set of curves showing the resonance of the supporting structure of my present invention as compared with that of conventional pick-up arms.

Referring more particularly to the drawing, wherein similar reference characters designate corresponding parts throughout, there is shown, in Fig. 1, a turntable 1 which supports a record 3 in playing position. Pivotally mounted to one side of the turntable 1 in a bushing 5 for horizontal swinging movement over the record is a supporting arm 7 which, in turn, pivotally carries a frame member 9. The arm 7 is arranged for swinging movement in a horizontal plane from a position entirely clear of the record to a position over the record, as shown in Fig. 1, and the frame 9 is pivoted thereon for swinging movement from a vertical plane to a horizontal plane overlying the record as clearly shown in the same figure.

Figures 2, 4:
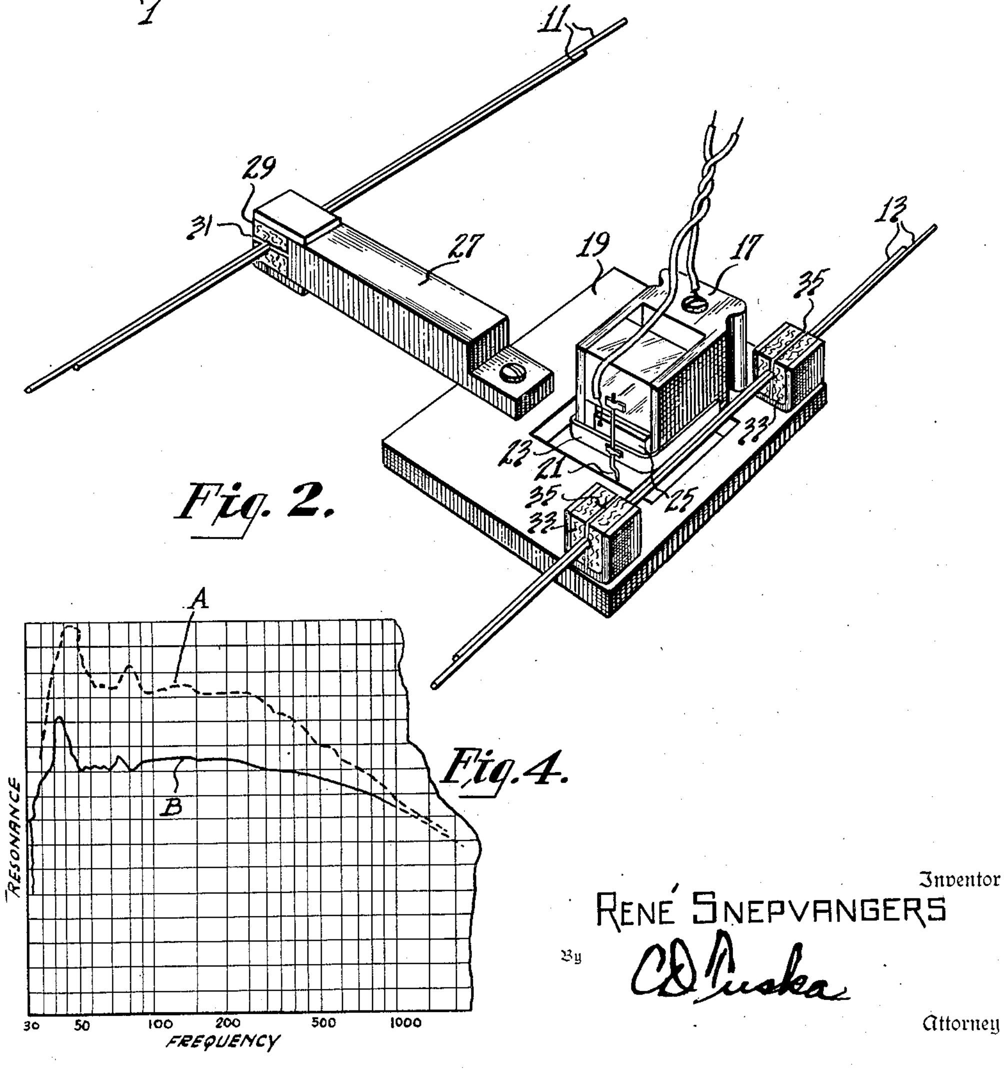
Figure 3:
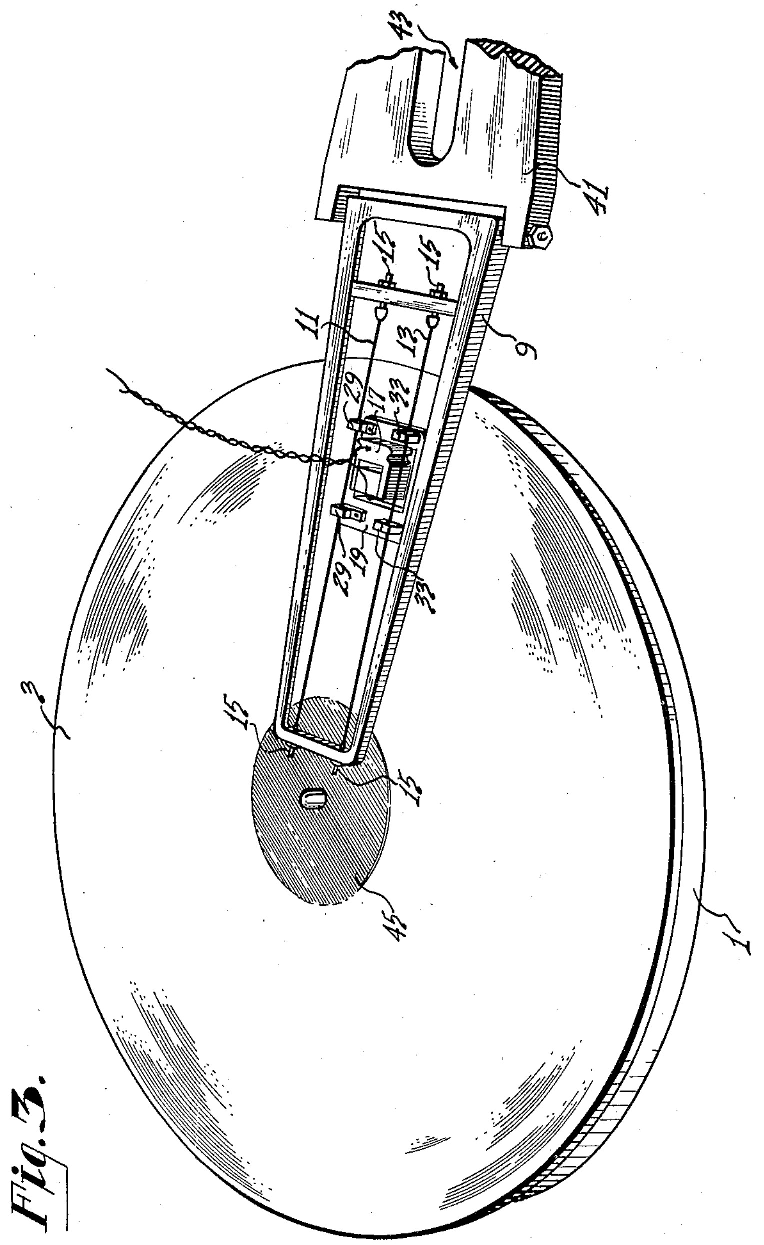

The frame 9 carries two pairs of resilient wire elements 11 and 13 arranged in spaced, parallel relation longitudinally along the frame 9, the wires of each pair being in contact with each other throughout their lengths, as best shown in Fig. 2. Each pair of wires is placed under more or less tension by means of set screws 15 to which the wires are anchored at their ends. Preferably, although not necessarily, the wires are placed under different degrees of tension when they are initially mounted on the set screws 15 so that, when they are stretched, they will still have different degrees of tension and therefore different natural periods of vibration.

A pick-up device 17 of any suitable type or construction is mounted on a carrier plate 19 and includes a needle 21 for cooperation with the record 3. As indicated above, the pick-up 17 may be of the type more particularly disclosed and claimed in my above identified, copending application and includes a vibratory, conductive strip or ribbon 23 to which the needle 21 is secured. The ribbon 23 cooperates with a fixed, conductive plate 25 spaced therefrom by an air gap and forming therewith a capacitor. Since further details of this particular pick-up are not material to the present invention, it is not believed necessary to describe them in greater detail, it being sufficient merely to point out that the output of the pick-up device may be connected to any suitable reproducing circuit in known manner.

The pick-up 17 and its mounting plate 19 are slidably mounted on the guide wires 11 and 13 for movement radially across the record 3 with the needle 21 in constant tangential relation to the record groove. For this purpose, the mounting plate 19 is provided with a laterally extending arm 27 to the end of which is secured a felt block 29 provided with a horizontal slot 31 in which the guide wire elements 11 are frictionally received. The plate 19 is also provided with one or more felt blocks 33 having aligned, vertical slots 35 in which the wire elements 13 are received. The wire elements 13 constitute the main guide wires for the pick-up unit assembly, the vertical slots 35 permitting this assembly to move vertically so as to readily accommodate itself to the surface of the record. The wires 11 in the horizontal slot 31 constitute an auxiliary guide to maintain the assembly in proper tangential relation to the record and to facilitate positioning of the needle on the record when the frame 9 is lowered to its horizontal position.

The frame 9 is preferably made of aluminum or other light-weight metal, or it may be made of any other suitable material, such as any of the well known plastics, wood, or the like, provided it is not easily subject to distortion or twisting. The wire elements 11 and 13 may be constituted by piano wire of approximately 10 mils diameter.

If desired, rods or flat strips may be used in place of the wires 11 and 13. Also, it is possible to use a single wire in each of the guide members in place of the double wire arrangement. However, I prefer to use a pair of contacting wires for the guide members 11 and 13 with each wire under a different degree of tension for the reason that this arrangement greatly reduces resonance of the supporting wires at troublesome frequencies because the respective wires have different natural periods of vibration. Furthermore, the friction afforded by the pads 29 and 33 will help to damp vibrations of the supporting structure and thus prevent them from adversely affecting the vibratory system of the pick-up.

The vertical slots 35 will maintain the pick-up in a fixed radial path across the record. With certain recordings, however, the record groove moving under the needle 21 may cause the pick-up assembly to move slightly along the groove, i. e., in a horizontal direction transversely across the frame 9, this being permitted somewhat by the flexible wire elements 13. Now, if this transverse motion happens to take place at a resonant frequency of the assembly, the pick-up unit would ordinarily be moved sufficiently to result in an undesired frequency modulation of the signal. However, the friction pad 29 will supply sufficient friction to damp this oscillatory motion and thereby avoid such frequency modulation.

The curves A and B of Fig. 4 show a comparison of the resonance of one type of conventional pick-up arm or mounting and that of my improved mounting described above. The dotted curve A represents the resonance of an ideal, prior art pick-up arm, while the solid curve B shows the resonance of my improved mounting. It will be seen, from an inspection of Fig. 4, that the resonance of the conventional system is considerably higher for frequencies below approximately 1000 C. P. S. Furthermore, it will be noted that curve B is quite flat, which is a very desirable characteristic, whereas the curve A rises considerably in the region from about 1000 C. P. S. down to about 50 C. P. S.

In Fig. 3, I have shown another and preferred form of my present invention. In this form, the frame member 9 is of trapezoidal form and is pivotally mounted to one side of the turntable at the longer one of its parallel sides, being free to swing from the horizontal position overlying the record 3, as shown, to a vertical position to one side of the record. The frame 9 in this case may be pivotally mounted on a plate 41 having a slot 43 for reception of a vertical post (not shown) which may be readily mounted in a suitable bearing to permit the assembly to swing in a horizontal plane to a position clear of the record. When the frame 9 is over the record, as shown in Fig. 3, it is disposed parallel thereto and about $\frac{1}{16}$ inch above the record with the shorter end of the trapezoid freely suspended above the label area 45 of the record 3. It is to be noted that, in this particular modification, the carrier plate 19 is provided with two pairs of friction pads 29 instead of only a single one as in the case of Fig. 1. In other respects, this modification is similar to the one shown in Fig. 1 and includes one pair of contacting wire, guide elements 11 which are frictionally received in the horizontal slots of the friction pads 29, and a second pair of contacting wire, guide elements 13 which are frictionally received in the vertical slots of the friction pads 33.

Although I have shown and described but two forms of my present invention, it will undoubtedly be apparent to those skilled in the art that many other modifications thereof, as well as changes in the one described, are possible. I therefore desire that my invention shall not be limited except insofar as is made necessary by the prior art and by the spirit of the appended claims.

What is claimed is:

1. In phonographic apparatus, the combination of means for supporting a record in playing position, a pick-up device adapted to cooperate with said record, a relatively rigid frame member pivotally mounted at one side of said record support and movable to a position overlying said record, and a pair of parallel, yieldable guide members on said frame member slidably supporting said pick-up device for movement over said record.

2. In phonographic apparatus, the combination of means for supporting a record in playing position, a pick-up device adapted to cooperate with said record, a frame member pivotally mounted at one side of said record support and movable to a position overlying said record, a pair of parallel, yieldable guide members on said frame member, and means slidably mounting said pick-up device on said guide members for movement over said record, said last named means including a pair of friction members one of which has frictional engagement with one of said guide members and the other of which has frictional engagement with the second of said guide members.

3. In phonographic apparatus, the combination of means for supporting a record in playing position, a pick-up device adapted to cooperate with said record, a relatively rigid frame member pivotally mounted at one side of said record support and movable to a position overlying said record, a pair of parallel, yieldable guide members on said frame member, and means slidably mounting said pick-up device on said guide members for movement over said record, said last named means including a pair of slotted members through the slot of one of which one of said guide members extends and through the slot of the other of which the second of said guide members extends.

4. In phonographic apparatus, the combination of means for supporting a record in playing position, a pick-up device adapted to cooperate with said record, a frame member pivotally mounted at one side of said record support and movable to a position overlying said record, a pair of parallel guide members on said frame member, and means slidably mounting said pick-up device on said guide members for movement over said record, said last named means including a pair of slotted friction members through the slot of one of which one of said guide members extends in frictional engagement therewith and through the slot of the other of which the second of said guide members extends in frictional engagement with said last named frictional member, said first mentioned slot of said one of said guide members extending in a direction which is substantially normal to the direction in which said second mentioned slot of said other of said guide members extends.

5. In phonographic apparatus, the combination of means for supporting a record in playing position, a pick-up device adapted to cooperate with said record, a frame member pivotally mounted at one side of said record support and movable to a position overlying said record, a pair of parallel guide members on said frame member, and means slidably mounting said pick-up device on said guide members for movement over said record, said last named means including a pair of slotted friction members through the slot of one of which one of said guide members extends in frictional engagement therewith and through the slot of the other of which the second of said guide members extends in frictional engagement with said last named friction member, said first mentioned slot of said one of said guide members extending in a horizontal direction and said second mentioned slot of said other of said guide members extending in a vertical direction.

6. In phonographic apparatus, the combination of means for supporting a record in playing position, a pick-up device adapted to cooperate with said record, a frame member pivotally mounted at one side of said record support and movable to a position overlying said record, a pair of parallel guide members on said frame member, and means slidably mounting said pick-up device on said guide members for movement over said record, said last named means including a pair of slotted friction members constituted of felt material and through the slot of one of which one of said guide members extends in frictional engagement therewith and through the slot of the other of which the second of said guide members extends in frictional engagement with said last named friction member.

7. In phonograph apparatus, the combination of means for supporting a record in playing position, a pick-up device adapted to cooperate with said record, a frame member pivotally mounted at one side of said record support and movable to a position overlying said record, a pair of parallel guide members of resilient material on said frame member, and means slidably mounting said pick-up device on said guide members for movement over said record, said last named means including a pair of friction members one of which has frictional engagement with one of said guide members and the other of which has frictional engagement with the second of said guide members.

8. In phonographic apparatus, the combination of means for supporting a record in playing position, a pick-up device adapted to cooperate with said record, a frame member pivotally mounted at one side of said record support and movable to a position overlying said record, a pair of wire elements on said frame member constituting guide members, and means slidably mounting said pickup device on said elements for movement over said record, said means including a pair of friction members one of which has frictional engagement with one of said wire elements and the other of which has frictional engagement with the second of said wire elements.

9. In phonographic apparatus, the combination of means for supporting a record in playing position, a pick-up device adapted to cooperate with said record, a frame member pivotally mounted at one side of said record support and movable to a position overlying said record, a pair of wire elements on said frame member constituting guide members, means slidably mounting said pick-up device on said elements for movement over said record, said means including a pair of friction members one of which has frictional engagement with one of said wire elements and the other of which has frictional engagement with the second of said wire elements, and means for placing said wire elements under more or less tension.

10. In phonographic apparatus, the combination of means for supporting a record in playing position, a pick-up device adapted to cooperate with said record, a frame member pivotally mounted at one side of said record support and movable to a position overlying said record, two pairs of wire elements on said frame member constituting guide members, the two wire elements of each pair being in contact with each other throughout their lengths, means for maintaining the wire elements of each pair under different degrees of tension whereby said elements will have different natural periods of vibration, and means slidably mounting said pick-up device on said two pairs of wire elements for movement over said record.

11. In phonographic apparatus, the combination of means for supporting a record in playing position, a pick-up device adapted to cooperate with said record, a frame member pivotally mounted at one side of said record support and movable to a position overlying said record, two pairs of wire elements on said frame member constituting guide members, the two wire elements of each pair being in contact with each other throughout their lengths, means for maintaining the wire elements of each pair under different degrees of tension whereby said elements will have different natural periods of vibration, and means slidably mounting said pick-up device on said two pairs of wire elements for movement over said record, said last named means including a pair of slotted, friction members through the slot of one of which the two guide members of one of said pair of contacting wire elements extend in frictional engagement with said one friction member and through the slot of the other of which the two guide members of the second pair of contacting wire elements extend in frictional engagement with said last named friction member.

12. The invention set forth in claim 11 characterized in that said frame member is of trapezoidal form.

13. The invention set forth in claim 11 characterized in that said frame member is of trapezoidal form, and characterized further in that said frame member is pivotally mounted at the longer of its two parallel sides.

14. A phonograph pick-up mounting comprising a frame member carrying two pairs of wire elements thereon for slidably supporting a pick-up device, the two elements of each pair being in contact with each other throughout their lengths, and each pair of said elements being spaced from the other pair.

15. A phonograph pick-up mounting comprising a frame member carrying two pairs of wire elements thereon for slidably supporting a pick-up device, the two elements of each pair being in contact with each other throughout their lengths, and each pair of said elements being spaced from the other pair, and means for placing each of said elements selectively under different degrees of tension.

16. In phonographic apparatus, the combination of means for supporting a record in playing position, a pick-up device adapted to cooperate with said record, a relatively rigid frame member pivotally mounted at one side of said record support and movable to a position overlying said record, and yieldable tenuous members on said frame member slidably carrying said pick-up device for movement over said record.

RENÉ SNEPVANGERS.

REFERENCES CITED

The following references are of record in the file of this patent:

UNITED STATES PATENTS

| Number | Name | Date |
|---|---|---|
| 1,291,515 | Hinckley | Jan. 14, 1919 |
| 1,868,304 | Cargill | July 19, 1932 |
| 2,219,230 | Krause | Oct. 22, 1940 |
| 2,287,809 | Leonard | June 30, 1942 |

FOREIGN PATENTS

| Number | Country | Date |
|---|---|---|
| 571,301 | Germany | Feb. 27, 1933 |
| 242,821 | Great Britain | Nov. 19, 1925 |
| 287,954 | Great Britain | Mar. 21, 1928 |
| 317,305 | Great Britain | Aug. 12, 1929 |